United States Patent
Tiwari et al.

(10) Patent No.: US 11,558,805 B2
(45) Date of Patent: Jan. 17, 2023

(54) METHOD AND APPARATUS FOR MANAGING CAG RELATED PROCEDURE IN WIRELESS COMMUNICATION NETWORK

(71) Applicant: Samsung Electronics Co., Ltd., Suwon-si (KR)

(72) Inventors: Kundan Tiwari, Bangalore (IN); Narendranath Durga Tangudu, Bangalore (IN); Rajavelsamy Rajadurai, Bangalore (IN); Lalith Kumar, Bangalore (IN); Varini Gupta, Bangalore (IN); Anikethan Ramakrishna Vijaya Kumar, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/221,226

(22) Filed: Apr. 2, 2021

(65) Prior Publication Data
US 2021/0314848 A1    Oct. 7, 2021

(30) Foreign Application Priority Data

Apr. 3, 2020  (IN) ............................ 202041014924
May 15, 2020 (IN) ............................ 202041020557
Mar. 29, 2021 (IN) ............................ 202041014924

(51) Int. Cl.
*H04W 48/02* (2009.01)
*H04W 48/16* (2009.01)
(Continued)

(52) U.S. Cl.
CPC ............ *H04W 48/02* (2013.01); *H04W 8/08* (2013.01); *H04W 48/16* (2013.01); *H04W 76/25* (2018.02); *H04W 84/042* (2013.01)

(58) Field of Classification Search
CPC ....... H04W 48/02; H04W 8/08; H04W 48/16; H04W 76/25; H04W 84/042; H04W 8/20; H04W 60/04
See application file for complete search history.

(56) References Cited

U.S. PATENT DOCUMENTS

2019/0182655 A1  6/2019 Gupta et al.
2022/0159615 A1* 5/2022 Ryu .................... H04W 68/005

FOREIGN PATENT DOCUMENTS

WO       2020/036364 A1    2/2020

OTHER PUBLICATIONS

Ericsson, "Updating the UE with new CAG information", 3GPP TSG-SA WG2 Meeting #137E, Feb. 24-27, 2020, Electronic Meeting, S2-2002585, Feb. 29, 2020.
(Continued)

*Primary Examiner* — Diane D Mizrahi
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method and apparatus for managing CAG related procedure in a wireless communication network is provided.

14 Claims, 9 Drawing Sheets

(51) Int. Cl.
  *H04W 76/25*     (2018.01)
  *H04W 8/08*      (2009.01)
  *H04W 84/04*     (2009.01)

(56) References Cited

OTHER PUBLICATIONS

Huawei et al., "CAG-only indication and empty Allowed CAG list", 3GPP TSG-WG SA2 Meeting #137E e-meeting, Elbonia, Feb. 24-27, 2020, S2-2002144, Feb. 18, 2020.
3GPP; TSG CT; Non-Access-Stratum (NAS) functions related to Mobile Station (MS) in idle mode, 3rd Generation Partnership Project; Technical Specification Group Core Network and Terminals; Non-Access-Stratum (NAS) functions related to Mobile Station (MS) in idle mode (Release 16), Mar. 27, 2020.
International Search Report dated Jun. 25, 2021, issued in International Application No. PCT/KR2021/004139.
Written Opinion dated Jun. 25, 2021, issued in International Application No. PCT/KR2021/004139.

\* cited by examiner

METHOD AND APPARATUS FOR MANAGING CAG RELATED PROCEDURE IN WIRELESS COMMUNICATION NETWORK

CROSS-REFERENCE TO RELATED APPLICATION(S)

This application is based on and claims priority under 35 U.S.C. § 119(a) of an Indian provisional patent application number 202041014924, filed on Apr. 3, 2020, in the Indian Patent Office, of an Indian provisional patent application number 202041020557, filed on May 15, 2020, in the Indian Patent Office, and of an Indian complete patent application number 202041014924, filed on Mar. 29, 2021, in the Indian Patent Office, the disclosures of each of which is incorporated by reference herein in its entirety.

BACKGROUND

1. Field

The disclosure relates to wireless communication network. More particularly, the disclosure relates to a method and a system for managing Closed Access Groups (CAG) related procedure in the wireless communication network.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, Public Network Integrated Non-Public Networks ((PNI-NPN)) are NPNs made available via Public Land Mobile Network (PLMNs) by using for example dedicated Data Network Name (DNNs), or by one (or more) Network Slice instances allocated for the NPN. When the PNI-NPNs is made available via a public land mobile network (PLMN), then a User Equipment (UE) shall have a subscription for the PLMN in order to access the PNI-NPNs. As network slicing does not enable a possibility to prevent the UE from trying to access the PNI-NPN in areas where the UE is not allowed to use the Network Slice allocated for the NPN, a Closed Access Group (CAG) is optionally used to apply access control.

The CAG identifies a group of subscribers who are permitted to access one or more CAG cells associated with the CAG. The CAG is used for the PNI-NPNs to prevent UE(s), which are not allowed to access the NPN via the associated CAG cell(s), from automatically selecting and accessing the associated CAG cell(s). The CAG is used for access control e.g. authorization at cell selection and configured in the subscription as part of the mobility restrictions i.e. independent from any Single Network Slice Selection Assistance Information (S-NSSAI). The CAG is not used as input to an Access and Mobility Management Function (AMF) selection nor network slice selection.

A home public land mobile network (HPLMN) network entity such as for example a unified data management (UDM) controller sends a complete CAG subscription (CAG subscription of a home PLMN (HPLMN) and visitor PLMN visitor public land mobile network (VPLMN)(s)) to the UE through the serving PLMN. The serving PLMN is a VPLMN when the UE is in the roaming area and the serving PLMN is a HPLMN when the UE is not in the roaming area.

The CAG subscription or CAG information list consists of allowed CAG identity (ID) list and an optional indication that the UE is allowed to access the $5^{th}$ generation service (5GS) of the PLMN via a CAG cell only. The serving PLMN then sends the complete CAG subscription to the UE in a CAG information list in a registration accept message when the UE is registering to the serving PLMN or in a configuration update command when already registered to the serving PLMN. However, a rogue serving PLMN can change the UE's CAG information list received from the UDM controller to keep the UE with the rogue serving PLMN by sending a separate indication for all PLMNs that the UE is allowed to access the 5GS via a CAG cell only. The rogue serving PLMN can also change the UE's CAG information list by deleting or sending wrong allowed CAG list for other PLMNs. The rogue serving PLMN may change the content of the CAG information list in a way that the UE will never camp on the CAG cell of higher priority VPLMN or influence the UE to camp to the rogue VPLMN always or anything that puts the rogue VPLMN in advantage. When the UE receives the modified CAG information list, the UE completely removes an existing CAG information list and stores the received CAG information list. Therefore, the UE will not select non-CAG or CAG cells of other PLMN even though there are other PLMNs of higher priority than the serving PLMN and allowed as per the subscription of the UE. As a result, the UE gets stuck to the rogue serving PLMN and the rogue serving PLMN completely controls the UE with respect to the PLMN selection procedure. This will lead to revenue loss to the HPLMN and may impact the services received by the UE and puts the rogue VPLMN in advantage at the cost of HPLMN and the UE. In worst case if a HPLMN disables roaming in the serving PLMN then the UE will not get service at all in that country.

When the UE is switched on and the UE initiates initial registration procedure, the UE sends a Registration Request message containing Subscription Concealed Identifier (SUCI) if the UE does not have a valid temporary identity. The network de-conceals the SUCI to a Subscription Permanent Identifier (SUPI) and performs authentication procedure. In some scenarios, even though the UDM determines that the UE is not allowed to a particular location area (for example, a CAG cell), the UDM may honor the request, as to make the UE get authenticated and establish security context in limited service mode, so that provisioning/update of configuration can be performed by the serving network.

In some scenarios, during authentication information retrieval procedure, even though the UDM determines that the authentication information retrieval operation for the UE cannot be authorized due to e.g. the UE does not have required subscription data, CAG ID is not in the allowed CAG list, access barring or roaming restrictions, the UDM may honor the request, as to make the UE get authenticated and establish security context in limited service mode, so that provisioning/update of configuration can be performed by the serving network. After successful authentication procedure, the UDM sends UE subscription to the AMF. If the UE is not allowed to register at location area because the UE has no subscription for the location area then the network rejects the registration procedure. In this scenario, the UE again initiates initial registration when the UE changes location and sends the SUCI in the registration request message. The network again performs authentication procedure using the SUCI. This is will create unnecessary authentication procedure.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method, a system, a UDM controller, and a UE for managing CAG related procedure in a wireless communication network based on whether a serving PLMN of the UE is a HPLMN or a VPLMN which prevents a rogue serving PLMN from completely controlling the UE with respect to PLMN selection procedure.

Another aspect of the disclosure is to provide send a new CAG information list with complete CAG subscription information associated with a plurality of PLMNs by the UDM controller to the UE, when the serving PLMN is the HPLMN. When the serving PLMN is the VPLMN, a new CAG information list with CAG subscription information associated with a serving VPLMN only is sent by the UDM controller to the UE. Therefore, the UE does not get struck with the rogue serving PLMN.

Additional aspects will be set forth in part in the description which follows and, in part, will be apparent from the description, or may be learned by practice of the presented embodiments.

In accordance with an aspect of the disclosure, a method for managing CAG related procedure in a wireless communication network is provided. The method includes determining, by an UDM controller belonging to a home public land mobile network (HPLMN), a need to update the CAG information in a user equipment (UE), the reasons (i.e. the need) to provide freshly or update the CAG information in the UE by the HPLMN entity like UDM is implementation dependent for example it can be due to change in the subscription of the UE or the change in the location area of the UE etc., and determining, by the UDM controller, whether a serving PLMN of the UE is the HPLMN or a visitor public land mobile network (VPLMN). Further, the method includes sending, by the UDM controller, to an access and mobility management function (AMF) controller a new CAG information list including complete CAG subscription information associated with a plurality of PLMNs, on determining that the serving PLMN is the HPLMN. Further, the UDM controller sends to the AMF controller a new CAG information list comprising CAG subscription information associated with a serving VPLMN only, on determining that the serving PLMN is the VPLMN.

In accordance with another aspect of the disclosure, a method is provided. The method includes receiving, by the AMF controller, the new CAG information list from the UDM controller and sending, by the AMF controller, the new CAG information list to the UE in a first non-access stratum (NAS) message.

In accordance with another aspect of the disclosure, a method is provided. The method includes receiving, by the UE, the new CAG information list from the AMF controller in the first NAS message and determining, by the UE, whether the serving PLMN is one of the HPLMN and the VPLMN. Further, the method also includes performing, by the UE, at least one of replacing an existing CAG information list stored in the UE with the new CAG information list received from the AMF controller, in response to determining that the serving PLMN is the HPLMN, and replacing the CAG information associated with the serving VPLMN in the existing CAG information list stored in the UE with the CAG information associated with the serving VPLMN received in the new CAG information list and discarding the received CAG information that is not associated with the serving PLMN, in response to determining that the serving PLMN is the VPLMN.

In accordance with another aspect of the disclosure, the UDM controller for managing CAG related procedures in a wireless communication network is provided. The UDM controller includes a communicator, a memory, a processor, and a CAG management controller. The CAG management controller is configured to determine a need to update the CAG information in a UE and determine whether a serving PLMN of the UE is a HPLMN or a VPLMN. The CAG management controller is configured to send to an AMF controller a new CAG information list including complete CAG subscription information associated with a plurality of PLMNs, on to determining that the serving PLMN is the HPLMN. Further, the CAG management controller is configured to send to the AMF controller a new CAG information list comprising CAG subscription information associated with a serving VPLMN only, on determining that the serving PLMN is the VPLMN.

In accordance with another aspect of the disclosure, an UE for managing CAG related procedure in a wireless communication network is provided. The UE includes a communicator, a memory, a processor, and a CAG list controller. The CAG list controller is configured to receive new CAG information list from an AMF controller in a first NAS message and determine whether the serving PLMN is a HPLMN or a VPLMN. Further, the CAG list controller is configured to replace an existing CAG information list stored in the UE with the new CAG information list received from the AMF controller, on determining that the serving PLMN is the HPLMN. Further, the CAG list controller is configured to replace the CAG information associated with a serving VPLMN in the existing CAG information list stored in the UE with the CAG information associated with the serving VPLMN received in the new CAG information list and discarding the received CAG information that is not associated with the serving PLMN, on determining that the serving PLMN is the VPLMN.

In accordance with an aspect of the present disclosure, an embodiment of the present invention provides a method for managing closed access group (CAG) related procedure in a wireless communication network, the method comprising: identifying, by an unified data management (UDM) entity belonging to a home public land mobile network (HPLMN), a need to update CAG information in a user equipment (UE); identifying, by the UDM entity, whether a serving public land mobile network (PLMN) of the UE is one of the HPLMN and a visitor public land mobile network (VPLMN); and sending, by the UDM entity, to an access and mobility management function (AMF) entity one of: a new CAG information list comprising a complete CAG subscription information associated with a plurality of PLMNs, in case that the serving PLMN is the HPLMN, or a new CAG information list comprising CAG subscription information associated with a serving VPLMN only, in case that the serving PLMN is the VPLMN.

In accordance with an another aspect of the present disclosure, an embodiment of the present invention provides a method for managing closed access group (CAG) related procedure in a wireless communication network, the method comprising: receiving, by the UE, the new CAG information list from an access and mobility management function (AMF) entity in a first non-access stratum (NAS) message; identifying, by the UE, whether a serving public land mobile network (PLMN) is one of a home public land mobile network (HPLMN) and a visitor public land mobile network (VPLMN); and replacing an existing CAG information list stored in the UE with the received new CAG information list, in case that the serving PLMN is the HPLMN, and replacing CAG information associated with a serving VPLMN in the existing CAG information list stored in the UE with CAG information associated with the serving VPLMN in the received new CAG information list and discarding CAG information that is not associated with the serving PLMN in the received new CAG information list, in case that the serving PLMN is the VPLMN.

In accordance with an another aspect of the present disclosure, an embodiment of the present invention provides an unified data management (UDM) entity for managing closed access groups CAG related procedure in a wireless communication network, the UDM entity comprising: a communicator; a memory; and a controller coupled to the communicator and the memory, and configured to: identify a need to update CAG information in user equipment (UE), identify whether a serving public land mobile network (PLMN) of the UE is one of a home public land mobile network (HPLMN) and a visitor public land mobile network (VPLMN), and send to an access and mobility management function (AMF) entity one of: a new CAG information list comprising a complete CAG subscription information associated with a plurality of PLMNs, in case that the serving PLMN is the HPLMN, or a new CAG information list comprising CAG subscription information associated with a serving VPLMN only, in case that the serving PLMN is the VPLMN.

In accordance with an another aspect of the present disclosure, an embodiment of the present invention provides A user equipment (UE) for managing CAG related procedure in a wireless communication network, the UE comprising: a communicator; a memory; and a controller coupled to the communicator and the memory, and configured to: receive, from an access and mobility management function (AMF) entity, a new CAG information list in a first non-access stratum (NAS) message, identify whether a serving public land mobile network (PLMN) is one of a home public land mobile network (HPLMN) and a visitor public land mobile network (VPLMN), replace an existing CAG information list stored in the UE with the received new CAG information list, in case that the serving PLMN is the HPLMN, and replace CAG information associated with a serving VPLMN in the existing CAG information list stored in the UE with CAG information associated with the serving VPLMN in the received new CAG information list and discard CAG information that is not associated with the serving PLMN in the received new CAG information list, in case that the serving PLMN is the VPLMN.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
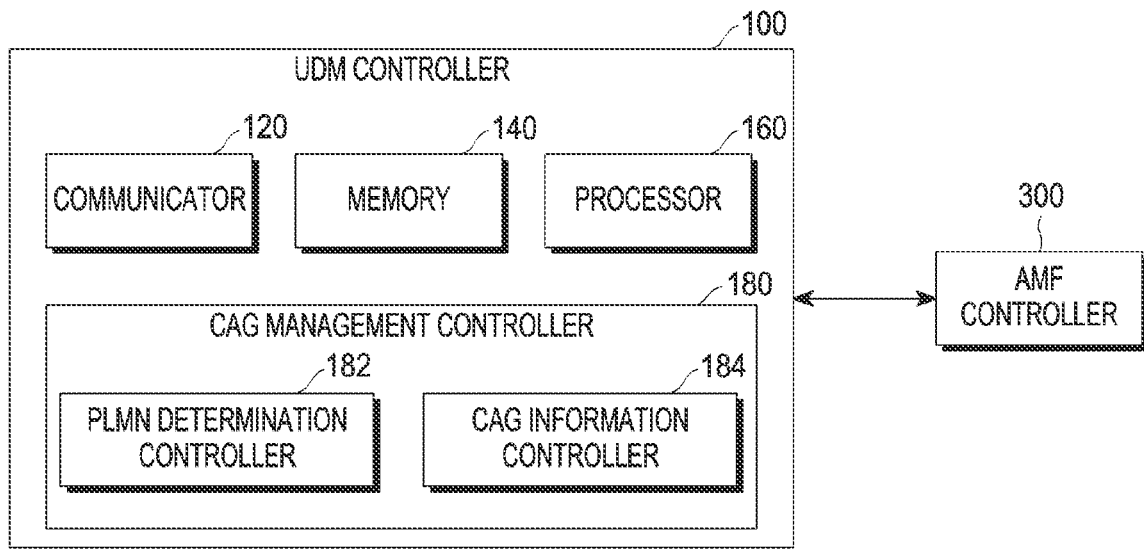
FIG. 1 is a block diagram of an UDM controller for managing a CAG related procedure in a wireless communication network, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a method for managing CAG related procedure in a wireless communication network. The method includes determining, by an UDM controller belonging to a HPLMN, a need to update the CAG information in a UE and determining, by the UDM controller, whether a serving PLMN of the UE is the HPLMN or a VPLMN). Further, the method includes sending, by the UDM controller, to an AMF controller a new CAG information list including complete CAG subscription information associated with a plurality of PLMNs, on determining that the serving PLMN is the HPLMN. Further, the UDM controller sends to the AMF controller a new CAG information list comprising CAG subscription information associated with a serving VPLMN only, on determining that the serving PLMN is the VPLMN. In the conventional methods and systems, the UDM controller sends the CAG information list which includes CAG subscription corresponding to all PLMNs to the serving PLMN of the UE. Therefore, a rogue serving PLMN can change the UE's CAG information list received from the UDM controller to keep the UE to the serving PLMN. The serving PLMN may change the CAG information list by sending a separate indication for all other PLMNs that the UE is allowed to access the 5GS via a CAG cell only. The serving PLMN may also change the CAG subscription by deleting or sending wrong allowed CAG list for other PLMNs or modify it to put the VPLMN in advantage.

Unlike to the conventional methods and systems, in the proposed method the UDM controller does not send the CAG information list related to all the PLMNs to the UE. The UDM controller checks whether the UE is with the HPLMN or the VPLMN and then sends the CAG information list accordingly. As a result, the serving PLMN cannot delete or send wrong allowed CAG list for other PLMNs. Also, UDM controller updates the complete CAG information list only when the UE is registering with the HPLMN as serving network. As a result, the UDM controller does not allow the serving PLMN to send a separate indication for all other PLMNs that the UE is allowed to access the 5GS via a CAG cell only. Hence, the UE will not be stuck with the serving PLMN due to inappropriate CAG information list.

Referring now to the drawings and more particularly to FIGS. 1, 2, 3A, 3B, 4A, 4B, and 5 to 8, where similar reference characters denote corresponding features consistently throughout the figure, these are shown preferred embodiments.

FIG. 1 is a block diagram of an UDM controller for managing CAG related procedure in a wireless communication network, according to an embodiment of the disclosure.

Referring to the FIG. 1, the UDM controller (100) is a node in the wireless communication network which manages unified data and interacts continuously with other nodes such as for example, an AMF controller (300). The UDM controller (100) includes a communicator (120), a memory (140), a processor (160), and a CAG management controller (180). A CAG information list includes CAG subscription associated with a UE (200) such as for example a PLMN ID, an allowed CAG ID list, and an optional indication that the UE (200) is allowed to access a 5th generation service (5GS) of a PLMN via a CAG cell only.

The communicator (120) is configured to communicate internally between internal hardware components and with external devices (e.g. server) via one or more networks (e.g. Radio technology). The communicator (120) includes an electronic circuit specific to a standard that enables wired or wireless communication.

The memory (140) is configured to store CAG information list which includes complete CAG subscription information associated with a plurality of PLMNs and UEs. The memory (140) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (140) may, in some examples, be considered a non-transitory storage medium. The term "non-transitory" may indicate that the storage medium is not embodied in a carrier wave or a propagated signal. However, the term "non-transitory" should not be interpreted that the memory (140) is non-movable. In certain examples, a non-transitory storage medium may store data that can, over time, change (e.g., in Random Access Memory (RAM) or cache).

The processor (160) is configured to execute various instructions stored in the memory (140) for managing the CAG procedure in the wireless communication network. The processor (160) communicates with the memory (140) and the CAG management controller (180). The processor (160) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (160) may include multiple cores and is configured to execute the instructions stored in the memory (140).

The CAG management controller (180) includes a PLMN determination controller (182) and a CAG information controller (184). The CAG management controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The PLMN determination controller (182) is configured to determine a need to update the CAG information in the UE (200) the reasons (i.e. the need) to provide freshly or update the CAG information in the UE (200) by the HPLMN entity like the UDM controller (100) is implementation dependent for example it can be due to change in the subscription of the UE (200) or the change in a location area of the UE (200) etc. Further, before providing the updated CAG information, the PLMN determination controller (182) is configured to determine whether a serving PLMN of the UE (200) is a HPLMN or a VPLMN. The identification of the serving PLMN of the UE (200) as the HPLMN or the VPLMN is sent to the CAG information controller (184). The HPLMN may also be an equivalent HPLMN (EHPLMN).

The CAG information controller (184) is configured to send to the AMF controller (300) a new CAG information list which includes UE's complete CAG subscription information associated with a plurality of PLMNs, on determining that the serving PLMN of the UE (200) is the HPLMN. The CAG information controller (184) is configured to send to the AMF controller (300) a new CAG information list which includes the CAG subscription information associated with a serving VPLMN only if the serving PLMN of the UE (200) is determined to be the VPLMN. The AMF controller (300) in turn sends the new CAG information list received from the CAG information controller (184) to the UE (200). The new CAG information list is sent by the CAG information controller (184) for example, during registration procedure in a Registration accept or generic UE configuration update procedure in a Configuration Update Command message or any other NAS message. It may be noted that the CAG information which is to be sent to the UE (200) by the UDM controller (100) are sent through the AMF controller (300). Both the UDM controller (100) and the UE (200) interact with each other through the AMF controller (300).

Therefore, when the UE (200) is registering with the serving PLMN, the UDM controller (100) sends the CAG subscription corresponding to the serving PLMN only. As a result, the serving PLMN cannot delete or send wrong allowed CAG list for other PLMNs. Also, UDM controller (100) updates the UE's complete CAG information list only when the UE (200) is registering with the HPLMN. As a result, the UDM controller (100) does not allow the serving PLMN to send a separate indication for all other PLMNs that the UE (200) is allowed to access the 5GS via a CAG cell only. Hence, in the proposed method the UE (200) will not be stuck with the serving PLMN due to inappropriate CAG information list.

Although the FIG. 1 shows the hardware elements of the UDM controller (100) but it is to be understood that other embodiments are not limited thereon. In other embodiments, the UDM controller (100) may include less or more number of elements. Further, the labels or names of the elements are used only for illustrative purpose and does not limit the scope of the disclosure. One or more components can be combined together to perform same or substantially similar function.

Figure 2:
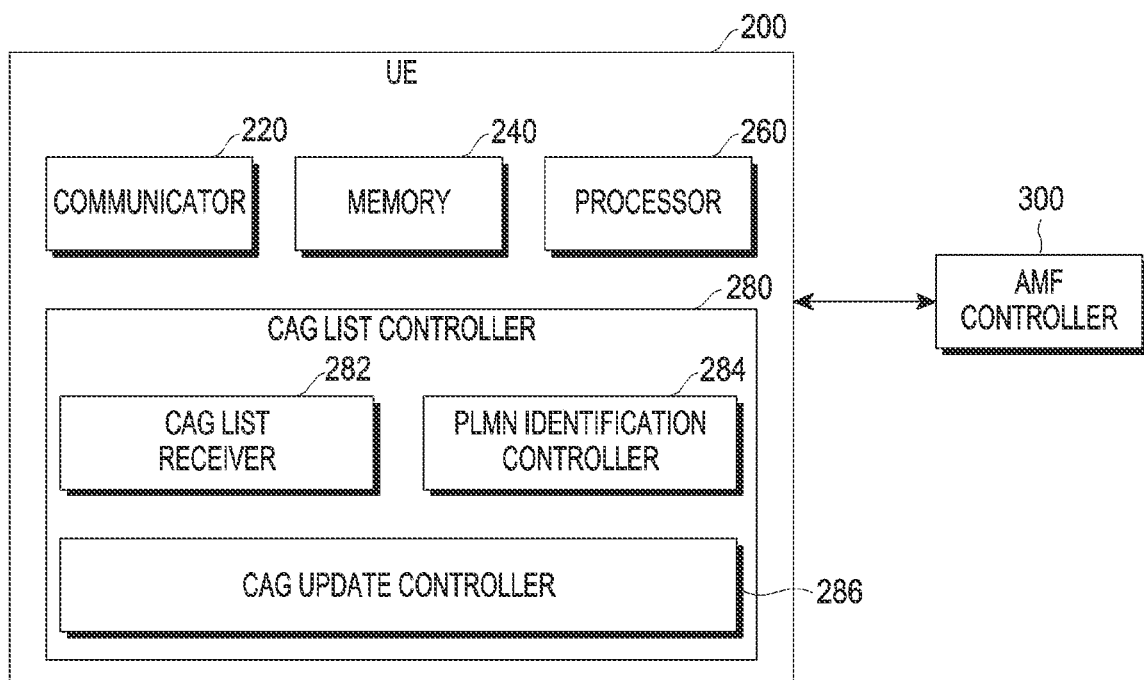
FIG. 2 is a block diagram of an UE for managing a CAG related procedure in a wireless communication network, according to an embodiment of the disclosure.

FIG. 2 is a block diagram of an UE for managing CAG related procedure in a wireless communication network, according to an embodiment of the disclosure.

Referring to the FIG. 2, the UE (200) interacts with the UDM controller (100) through the AMF controller (300). Examples of the UE (200) includes, but are not limited to a smart phone, a tablet computer, a Personal Digital Assistance (PDA), an Internet of Things (IoT) device, a wearable device, a laptop, etc. In an embodiment, the UE (200) includes a communicator (220), a memory (240), a processor (260) and a CAG list controller (280).

The communicator (220) is configured to communicate internally between internal hardware components and with external devices (e.g. server) via one or more networks (e.g. Radio technology). The communicator (120) includes an electronic circuit specific to a standard that enables wired or wireless communication.

The memory (240) is configured to store CAG information list which includes CAG subscription information associated with the HPLMN UDM controller (100*a*) and the VPLMNs to which the UE (200) is allowed to connect. The term connect in this embodiment indicates that UE will be able to camp and receive services on respective PLMN which can be either HPLMN or VPLMN. The memory (240) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (240) may, in some examples, be considered a non-transitory storage medium. The term "non-transitory" may indicate that the storage medium is not embodied in a carrier wave or a propagated signal. However, the term "non-transitory" should not be interpreted that the memory (240) is non-movable. In certain examples, a non-transitory storage medium may store data that can, over time, change (e.g., in Random Access Memory (RAM) or cache).

The processor (260) is configured to execute various instructions stored in the memory (240) for managing the CAG procedure in the wireless communication network. The processor (260) communicates with the memory (240) and the CAG list controller (280). The processor (260) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (260) may include multiple cores and is configured to execute the instructions stored in the memory (240).

The CAG list controller (280) includes a CAG list receiver (282), a PLMN identification controller (284) and a CAG list update controller (286). The CAG list controller (280) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The CAG list receiver (282) is configured to receive the new CAG information list from the AMF controller (300) in a first NAS message. The first NAS message may be for example, a Configuration Update command message. The first NAS message may be received during an initial registration accepted procedure or during a Mobility and periodic registration update accepted by the network. The REGISTRATION ACCEPT message may include a CAG information list IE and a CAG bit is to "CAG supported" in a 5GMM capability IE of the REGISTRATION REQUEST message.

The PLMN identification controller (284) is configured to determine whether the serving PLMN of the UE (200) is the HPLMN or the VPLMN. The identity of the serving PLMN of the UE (200) as the HPLMN or the VPLMN is then sent to the CAG list update controller (286).

The CAG list update controller (286) is configured to receive the identity of the serving PLMN and replace an existing CAG information list stored in the UE (200) with the new CAG information list received from the AMF controller (300) when the serving PLMN is identified as the HPLMN. The CAG list update controller (286) is configured to replace the CAG information associated with a serving VPLMN in the existing CAG information list stored in the UE (200) with the CAG information associated with the serving VPLMN received in the new CAG information list and discard the received CAG information that is not associated with the serving PLMN, when the serving PLMN is identified as the VPLMN.

Therefore, the UE (200) will not completely remove the existing CAG information list and store the new CAG information. As a result, the UE (200) is able to select non-CAG cells or CAG cells of other PLMN based on the actual subscription of the UE when the other PLMNs have higher priority PLMNs than the serving PLMN. Hence, even though the serving PLMN is a rogue PLMN, the serving PLMN will not be able to control PLMN selection procedures of the UE (200).

Although the FIG. 2 shows the hardware elements of the UE (200) but it is to be understood that other embodiments are not limited thereon. In other embodiments, the UE (200) may include less or more number of elements. Further, the labels or names of the elements are used only for illustrative purpose and does not limit the scope of the disclosure. One or more components can be combined together to perform same or substantially similar function.

Figure 3A:
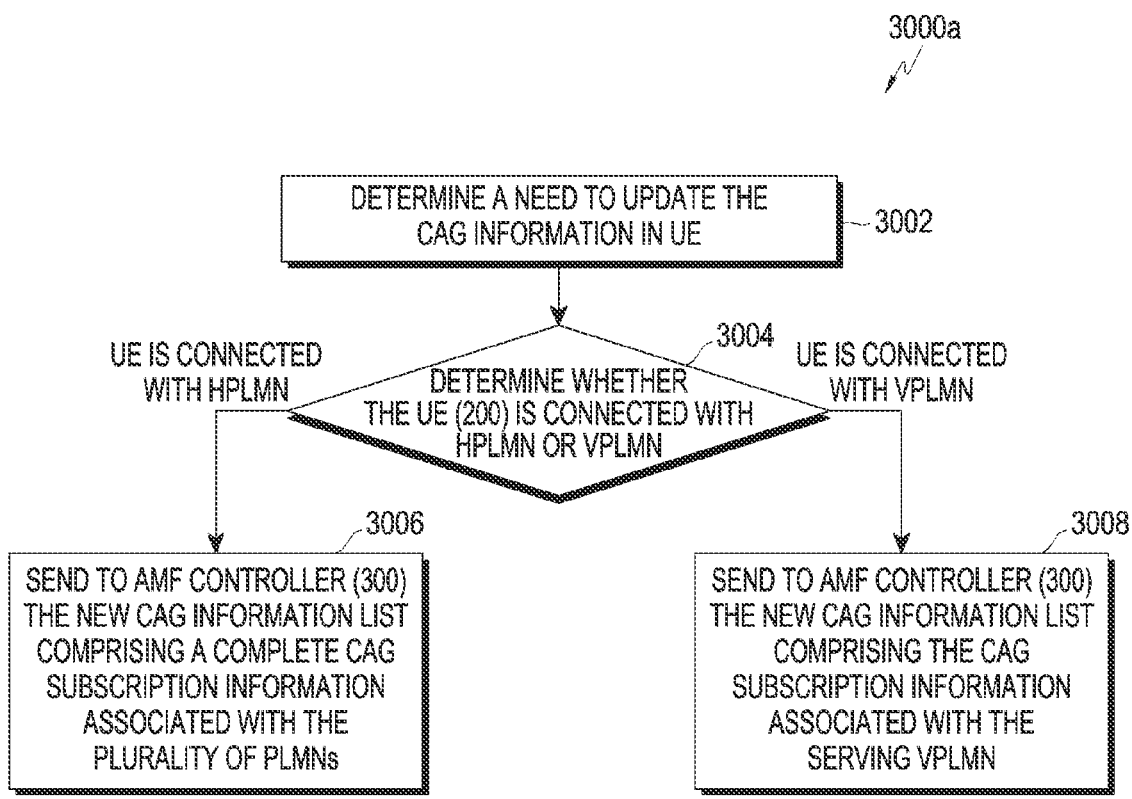
FIG. 3A is a flow chart illustrating a method for managing a CAG related procedure in a wireless communication network at a UDM controller, according to an embodiment of the disclosure.

FIG. 3A is a flow chart illustrating a method for managing a CAG related procedure in a wireless communication network at an UDM controller, according to an embodiment of the disclosure.

Referring to the FIG. 3A illustrating flow chart 3000*a*, at operation 3002, the UDM controller (100) determines the need to update the CAG information in the UE (200). For example, in the UDM controller (100) as illustrated in the FIG. 1, the CAG management controller (180) is configured to determine the need to update the CAG information in the UE (200).

At operation 3004, the UDM controller (100) determines whether the UE (200) is connected (i.e. served by) with the HPLMN or the VPLMN. For example, in the UDM controller (100) as illustrated in the FIG. 1, the CAG management controller (180) is configured to determine whether the UE (200) is connected with (i.e. served by) the HPLMN or the VPLMN.

Further, at operation 3006, the UDM controller (100) is configured to send to the AMF controller (300) the new CAG information list comprising the complete CAG subscription information associated with all the PLMNs, on determining that the UE (200) is connected with the HPLMN.

At operation 3008, the UDM controller (100) is configured to send to the AMF controller (300) the new CAG information list comprising the CAG subscription information associated with the serving VPLMN only, on determining that the UE (200) is connected with the VPLMN.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

Figure 3B:
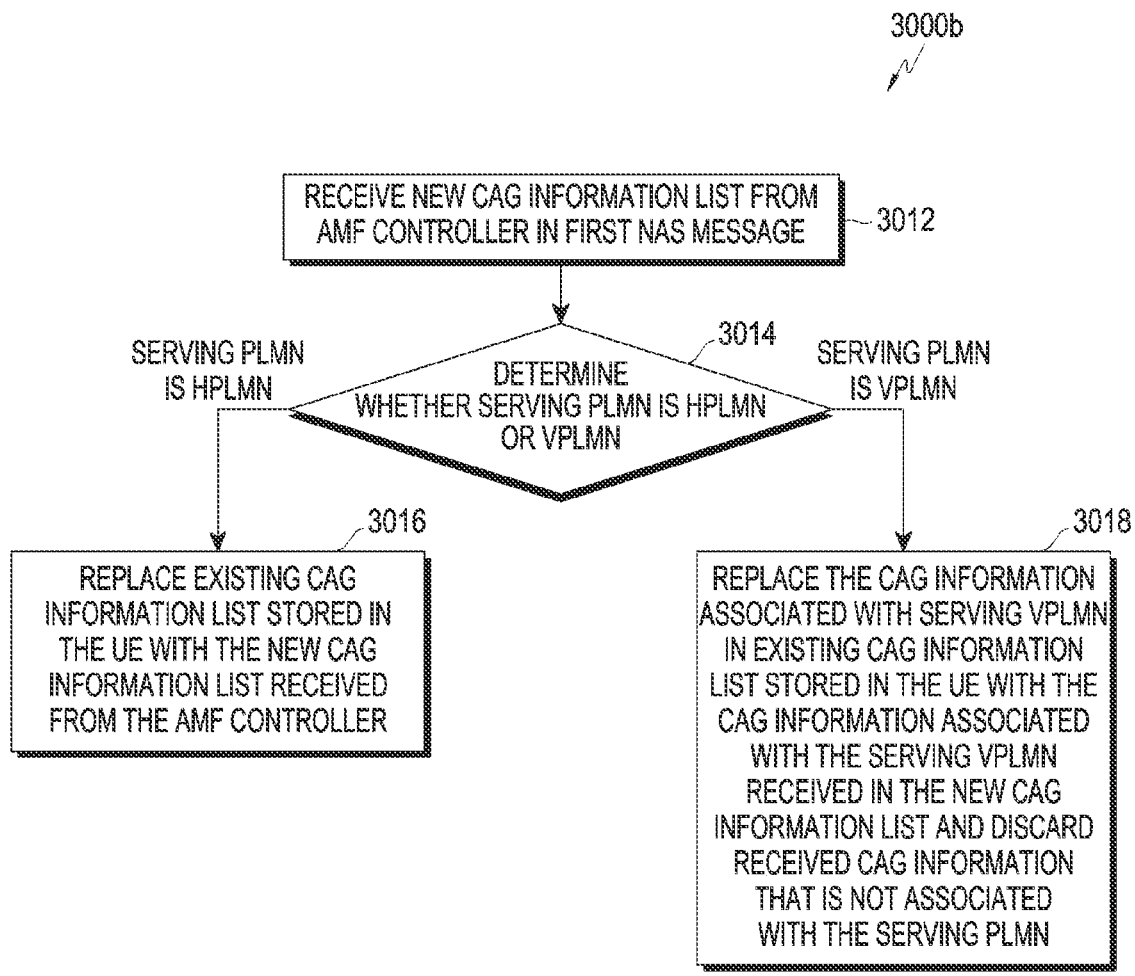
FIG. 3B is a flow chart illustrating a method for managing a CAG related procedure in a wireless communication network at a UE, according to an embodiment of the disclosure.

FIG. 3B is a flow chart illustrating a method for managing CAG related procedure in a wireless communication network at a UE, according to an embodiment of the disclosure.

Referring to the FIG. 3B illustrating flow chart 3000b, at operation 3012, the UE (200) receives the new CAG information list from the AMF controller (300) in the first NAS message. For example, in the UE (200) as illustrated in the FIG. 2, the CAG list controller (280) is configured to receive the new CAG information list from the AMF controller (300) in the first NAS message.

At operation 3014, the UE (200) determines whether the serving PLMN is the HPLMN or the VPLMN. For example, in the UE (200) as illustrated in the FIG. 2, the CAG list controller (280) is configured to determine whether the serving PLMN is the HPLMN or the VPLMN.

Further, at operation 3016, the UE (200) is configured replace the existing CAG information list stored in the UE (200) with the new CAG information list received from the AMF controller (300), on determining that the serving PLMN is the HPLMN.

At operation 3018, the UE (200) is configured to replace the CAG information associated with serving VPLMN in existing CAG information list stored in the UE (200) with the CAG information associated with the serving VPLMN received in the new CAG information list and discard the received CAG information that is not associated with the serving PLMN, on determining that the serving PLMN is the VPLMN.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

Figure 4A:
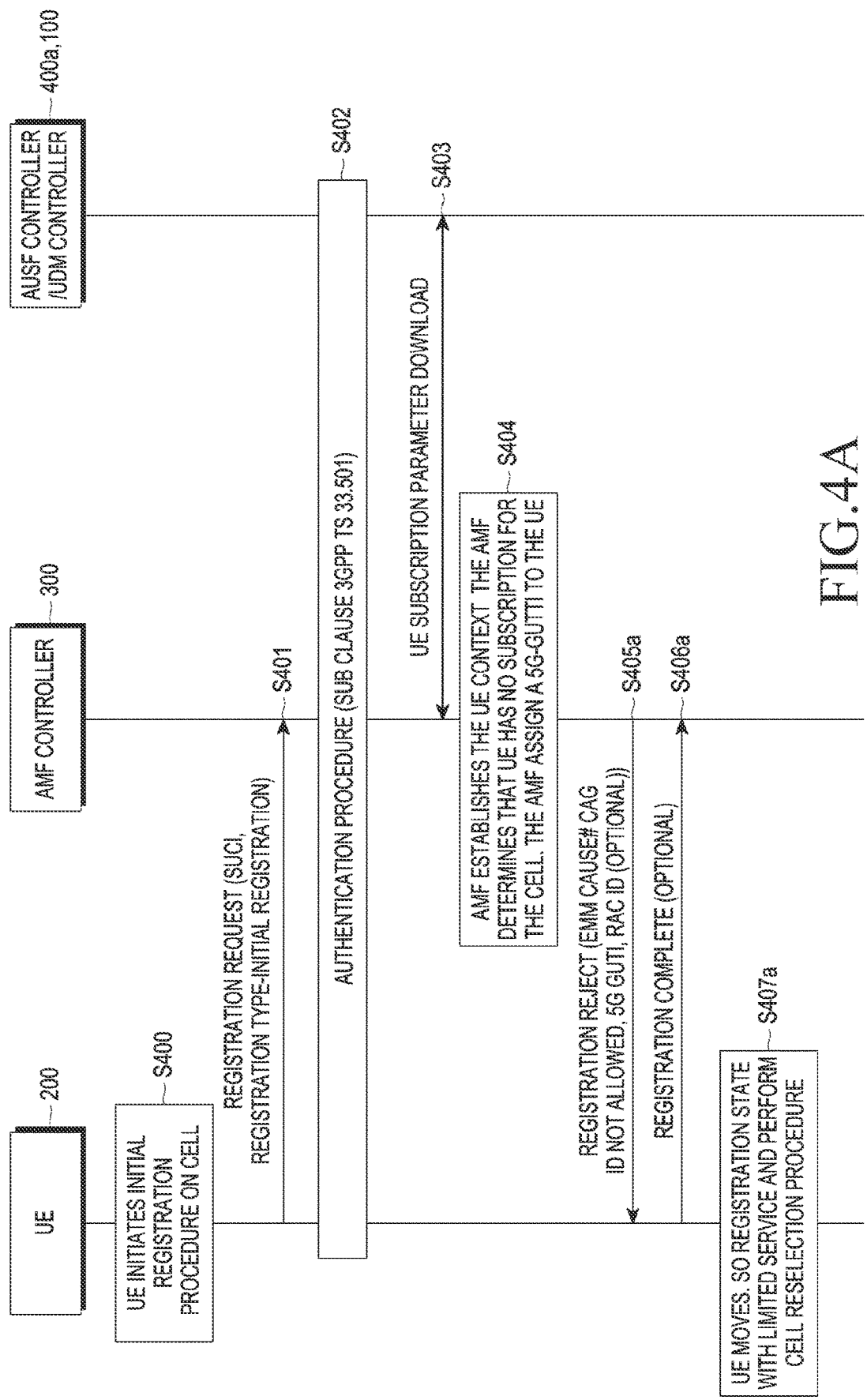
FIG. 4A is a signaling diagram illustrating a scenario of providing CAG information to a UE during an initial registration procedure, according to an embodiment of the disclosure.
Figure 4B:
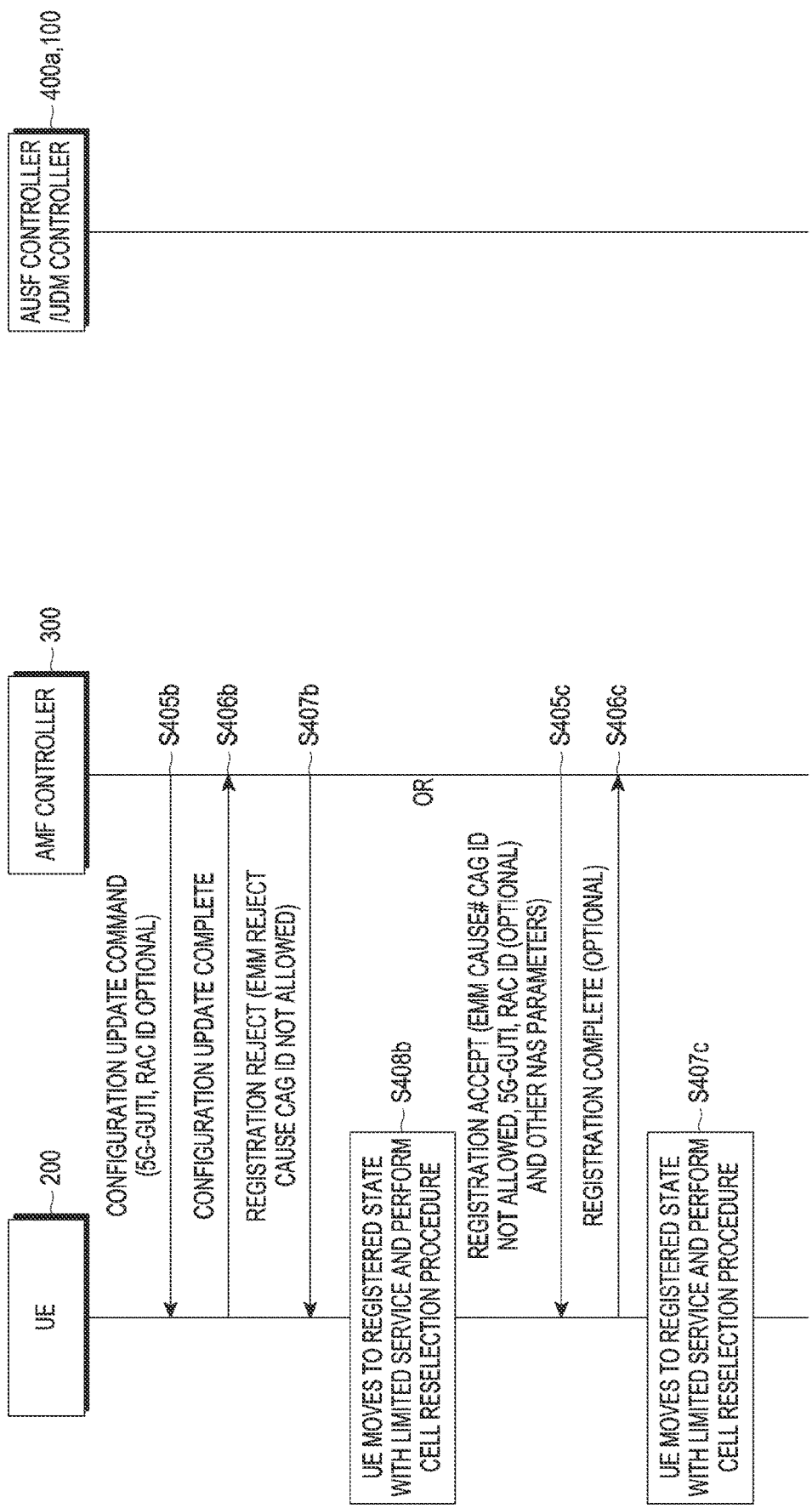
FIG. 4B is a signaling diagram illustrating a scenario of providing CAG information to a UE during an initial registration procedure, according to an embodiment of the disclosure.

FIGS. 4A and 4B are signaling diagrams illustrating a scenario of providing CAG information to a UE during an initial registration procedure, according to an embodiment of the disclosure.

Referring to the FIG. 4A consider the initial registration procedure as described below:

At operation S400, the UE (200) does not have a valid temporary identity i.e. 5G-Global Unique Temporary Identifier (GUTI). The UE (200) initiates initial registration procedure on a cell.

At operation S401, the UE (200) sends a Registration Request message containing a Subscription Concealed Identifier (SUCI) to the AMF controller (300). The AMF controller (300) sends the SUCI to the HPLMN AUSF controller (400a) using the procedure defined in the 3GPP TS 33.501.

At operation S402, the UDM controller (100) de-conceals the (SUPI) Subscription Concealed Identifier (SUCI) to Subscription Permanent Identifier (SUPI). The Authentication procedure is performed between the network and the UE (200) as described in 3GPP TS 33.501.

At operation S403, after the successful authentication procedure, the UDM controller (100) sends the subscription data to the AMF controller (300) as per the registration procedure defined in the specification 23.502.

At operation S404, the AMF controller (300) determines that the UE (200) does not have a valid subscription for the current cell (e.g. the UE (200) does not have a valid subscription for the CAG cell on which the registration was initiated or the current tracking area is forbidden for the UE (200)), even then the AMF controller (300) allocates a 5G-GUTI to the UE (200) and executes one of the following procedure operations: S405a, S406a and S407a, or operations: S405b, S406b, S407b and S408b or operations: S405c, S406c and S407c.

At operation S405a, the AMF controller (300) sends Registration Reject message including at least one of the following: an appropriate reject cause (e.g., 5GMM Cause #76—Not authorized for this CAG or authorized for CAG cells only, CAG subscriptions expired, 5GMM Cause #12—Tracking area not allowed, Cause #13—Roaming not allowed in this tracking area or 5GMM cause #15, No suitable cells in tracking area), allowed CAG list and 5G-GUTI.

At operations S406a-S407a, when the UE (200) receives the Registration Reject message with the 5G-GUTI, the UE (200) stores the 5G-GUTI and uses the 5G-GUTI in subsequent NAS message (e.g. Registration procedure due to mobility). The UE (200) may move to the 5GMM-REGISTERED state. After the UE (200) goes to idle mode the UE (200) will perform cell reselection procedure. The UE (200) will process the 5GMM cause value as defined in the 3GPP TS 24.501.

In an embodiment, when execution of the operations, S405a, S406a and S407a, the UE (200) moves in to deregistration procedure and the AMF controller (300) also De-Registers the UE, but the UE (200) and the AMF controller (300) maintains the context.

In an embodiment, when execution of the operations, S405a, S406a and S407a, the UE (200) moves into registered state, with limited mode service.

Referring to FIG. 4B, at operation S405b, the AMF controller (300) sends the 5G-GUTI with other possible parameters in a Configuration Update Command.

At operation S406b, the UE (200) on receiving the Configuration Update command with 5G-GUTI, the UE (200) stores the 5G-GUTI and uses the 5G-GUTI in the subsequent NAS procedure e.g. during the mobility registration procedure, the UE (200) optionally sends Configuration Update complete message to the AMF controller (300). The AMF controller (300) starts using the 5G-GUTI on receiving the Configuration Update complete from the UE (200).

At operations S407b-S408b, the AMF controller (300) sends Registration Reject message containing the appropriate 5GMM reject cause (e.g., 5GMM Cause #76—Not authorized for this CAG or authorized for CAG cells only, CAG subscriptions expired, 5GMM Cause #12—Tracking area not allowed, Cause #13—Roaming not allowed in this tracking area or 5GMM cause #15, No suitable cells in tracking area). The UE (200) on receiving the Registration reject message acts on the reject cause as defined in the 3GPP TS 24.501. The UE (200) and the AMF controller (300) are in the registered state.

At operation S405c, the AMF controller (300) sends Registration Accept message containing 5G-GUTI and appropriate 5GMM cause (e.g., 5GMM Cause #76—Not authorized for this CAG or authorized for CAG cells only, CAG subscriptions expired, 5GMM Cause #12—Tracking area not allowed, Cause #13—Roaming not allowed in this tracking area or 5GMM cause #15, No suitable cells in tracking area).

At operations S406c-S407c, the UE (200) on receiving the Registration Accept with the 5G-GUTI, the UE (200) stores the 5G-GUTI and uses the 5G-GUTI in the subsequent NAS procedure e.g. during the mobility registration procedure. The UE (200) sends Registration Complete message to the AMF controller (300). The AMF controller (300) starts using the 5G-GUTI on receiving the Registration Accept message from the UE (200). The UE (200) acts on the reject cause as defined in the 3GPP TS 24.501. The UE (200) and the AMF controller (300) are in the registered state.

When the UDM controller (100) receives a message from the AMF controller (300) to get the user subscription information as per the procedure defined in 23.502 during the registration procedure, then the UDM controller (100) determines whether the UE (200) is in a VPLMN or HPLMN. If the UDM controller (100) determines that the UE (200) is in a HPLMN then the UDM controller (100) may send complete CAG information related to HPLMN and VPLMN(s) if the UE (200) has CAG subscription with the VPLMN(s). If the UDM controller (100) determines that the UE (200) is in the VPLMN, then the UDM controller (100) sends the CAG information related to the VPLMN only.

When the AMF controller (300) receives the CAG information then the AMF controller (300) sends this information transparently to the UE (200).

When the UE (200) receives the CAG information list in a NAS message then the UE (200) determines whether the UE (200) is registered or registering to the VPLMN or HPLMN. If the UE (200) is registering or registered to the HPLMN then the UE (200) stores and uses the CAG information list as received from the HPLMN. If the UE (200) is registered or registering to the VPLMN, then the UE (200) checks if the CAG information list contains the CAG information related to the VPLMN only or other PLMN. If the CAG information contains the CAG information related to the VPLMN only then the UE (200) shall replace the stored CAG information of the VPLMN with the received CAG information list of the VPLMN and uses the current/updated CAG information list of the VPLMN. If the CAG information list contains CAG information related to the other PLMN, then the UE (200) discards received the CAG information related to other PLMN. In this case the UE (200) may deprioritize the VPLMN for a certain time i.e. it puts the VPLMN as lowest priority for PLMN selection for a certain time. After certain time the UE (200) may prioritize it again.

The CAG information list consists of at least one of the following:

1. allowed CAG ID list,
2. Indication that the UE (200) is only allowed to access 5GS via CAG cells, or
3. For each CAG ID present in the allowed CAG list an indication whether the user can manually select the CAG ID or not during manual PLMN selection procedure or not. If the CAG ID is allowed to select the during the manual PLMN selection procedure, then the UE (200) will display the CAG ID to the user if the CAG cell broadcasting the CAG ID is found at the location and if the user selects the CAG ID then the UE (200) shall initiate the registration procedure if the CAG ID is not in the allowed list otherwise the UE (200) shall not display the CAG ID to the user or if the CAG ID is displayed and the user selects the CAG ID then the UE (200) will not take any action e.g. will not initiate any NAS procedure (e.g. registration procedure).
4. An indication whether manual CAG ID selection procedure is allowed in a PLMN or not. If the indication indicates that the manual CAG ID selection is allowed PLMN wide then the UE (200) shall display CAG ID(s) of any cell(s) present at the location. If the user selects a CAG ID and the CAG ID is not the allowed CAG list then the UE (200) shall initiate registration procedure on the CAG cell broadcasting the selected CAG ID. If the indication indicates that CAG ID is not allowed PLMN wide then the UE (200) shall not display CAG ID of any CAG cell present at the location or any NAS procedure (e.g. registration procedure on the CAG Cell is not allowed when the CAG ID is selected in any case. In one embodiment the value of this indicator is decided by VPLMN itself based on the VPLMN policy. The value is set independent of any HPLMN policy or interaction with HPLMN.

In one embodiment, indicator defined 3) or 4) is sent as a separate information element in the NAS message i.e. indicator is not contained in the CAG information list, both the indicators are sent integrity protected.

In one embodiment, if the UE (200) does not receives these indicator then the UE (200) applies the default behavior that the UE (200) will display the CAG ID to the user, if the user selects the CAG ID if the CAG is not in the allowed CAG ID list then the UE (200) shall initiate registration procedure on the CAG cell broadcasting the selected CAG ID.

In an embodiment the AMF controller (300) also sends indication during a NAS procedure e.g. registration procedure (e.g. registration accept message) whether the manual CAG information procedure is allowed in the registration area. On receiving the indication the UE (200) may initiate the manual CAG selection procedure based on the indication, otherwise the UE (200) shall not perform manual CAG selection procedure in the registration area.

In an embodiment, an indication is also sent to the UE (200) in a NAS message whether manual PLMN selection procedure is applicable for a PLMN or not in a NAS procedure e.g. registration procedure (e.g. registration accept message). The UE (200) may select the PLMN manually if the indicator indicates that manual PLMN selection procedure of the PLMN is allowed. The UE (200) after selecting the PLMN manually initiates the registration procedure to the network. If the indicator indicates manual PLMN selection of the PLMN is not allowed then the UE (200) shall not select or initiate registration procedure on the PLMN ID as outcome of manually PLMN selection procedure. In one example this indicator is broadcasted in a cell, and the UE (200) performs the manual PLMN selection procedure of the PLMN on the cell if the broadcast indicator allows to perform the manual PLMN selection procedure otherwise the UE (200) shall not perform it. In an example, an indicator indicates whether manual PLMN selection of any PLMN is allowed or not. In this case, the UE (200) shall not perform manual PLMN selection procedure of any PLMN, if the indicator prohibits it, otherwise the indicator allows performing the manual PLMN selection procedure then the UE (200) may perform manual PLMN selection procedure. This indicator is sent in system information or in a NAS message during a NAS procedure (e.g. in e.g. registration procedure (e.g. registration accept message)).

Figure 5:
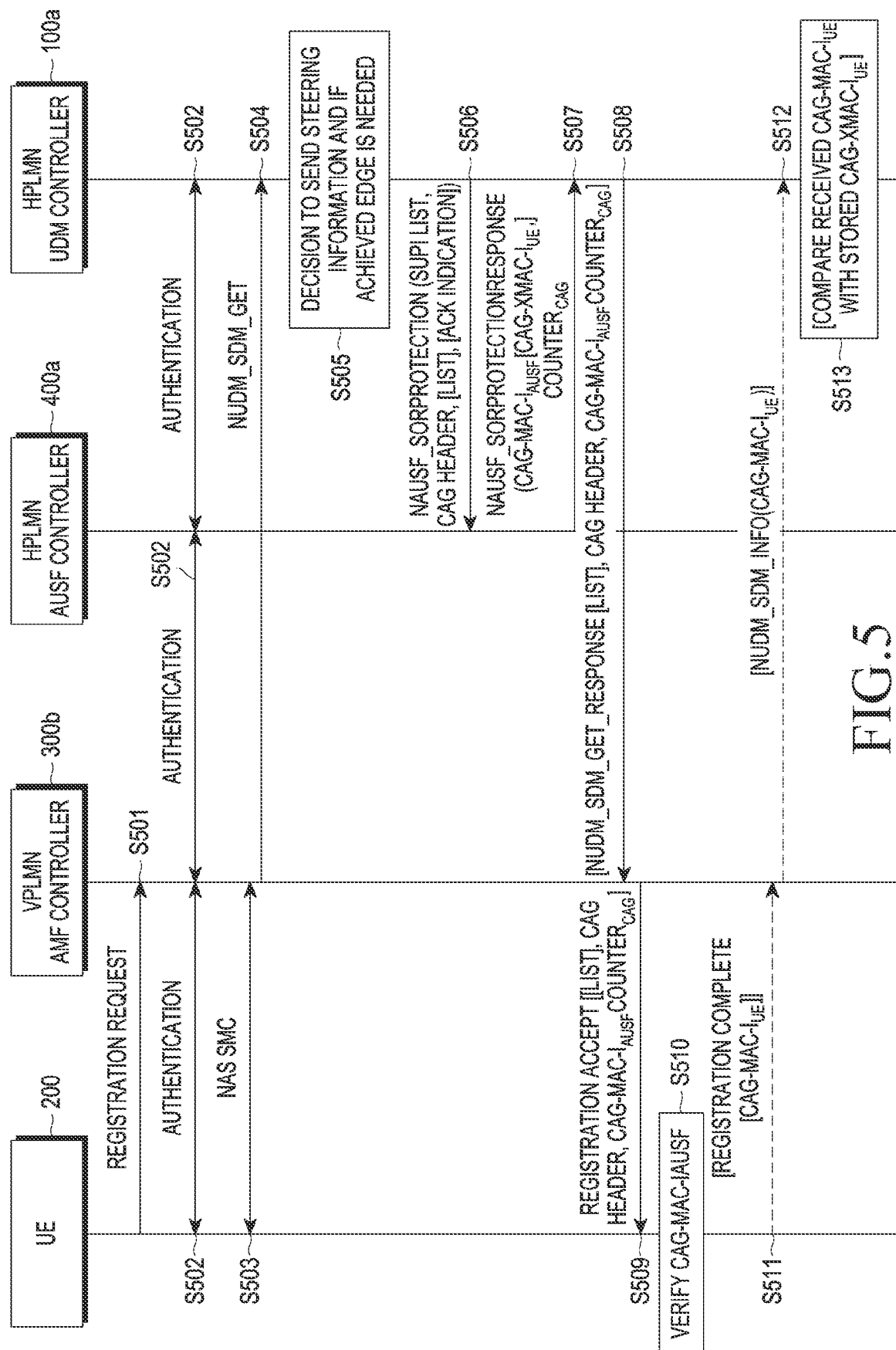
FIG. 5 is a signaling diagram illustrating a scenario of providing a CAG information list to a UE during a registration procedure, according to an embodiment of the disclosure.

FIG. 5 is a signaling diagram illustrating a scenario of providing a CAG information list to a UE during a registration procedure, according to an embodiment of the disclosure.

Referring to the FIG. 5 consider a procedure to send the CAG Information to the UE (200) in the VPLMN. The security procedure for the case when the UE (200) registers with VPLMN AMF is described below:

At operation S501, the UE (200) initiates registration by sending Registration Request message to the VPLMN AMF controller (300b).

At operations S502-S503, the VPLMN AMF controller (300b) executes the registration procedure as defined in sub-clause 4.2.2.2.2 of 3GPP TS 23.502. As part of the registration procedure, the VPLMN AMF controller (300b) executes primary authentication of the UE (200) and then initiates the NAS SMC procedure, after the authentication is successful.

At operation S504, the VPLMN AMF controller (300b) invokes Nudm_SDM_Get service operation message to the HPLMN UDM controller (100a) to get amongst other information the Access and Mobility Subscription data for the UE (200) (operation 14b in sub-clause 4.2.2.2.2 of 3GPP TS 23.502).

At operation S505, the HPLMN UDM controller (100a) decides to send the Steering Information, and obtains the list as described in TS 23.122 [53].

At operation S506, the HPLMN UDM controller (100a) shall invoke Nausf_CAGProtection service operation message to a HPLMN AUSF controller (400a) to get CAG-MAC-IAUSF and CounterSCAG. If the HPLMN decided that the UE (200) is to acknowledge the successful security check of the received Steering Information List, then the HPLMN UDM controller (100a) shall set the corresponding indication in the CAG header (see TS 24.501) and include the ACK Indication in the Nausf_CAGProtection service operation message to signal that it also needs the expected CAG-XMAC-IUE.

At operation S507, in case, the Steering Information List is not available or HPLMN determines that no steering of the UE (200) is required, then the List indication value in the CAG header shall be set to null and list shall not be included. The inclusion of list of preferred PLMN/access technology combinations (if provided) and the CAG header in the calculation of CAG-MAC-IAUSF allows the UE (200) to verify that the Steering Information List received is not tampered with or removed by the VPLMN and if the HPLMN UDM controller (100a) requested an acknowledgement. The expected CAG-XMAC-IUE allows the HPLMN UDM controller (100a) to verify that the UE (200) received the Steering Information List.

At operation S508, the HPLMN UDM controller (100a) responds to the Nudm_SDM_Get service operation to the VPLMN AMF controller (300b), which shall include the CAG header, Steering Information List, CAG-MAC-IAUSF and CounterCAG within the Access and Mobility Subscription data. If the HPLMN UDM controller (100a) requests an acknowledgement, it shall temporarily store the expected CAG-XMAC-IUE.

At operation S509, the VPLMN AMF controller (300b) shall include the Steering Information List, the CAG-MAC-IAUSF, CounterCAG and the CAG header to the UE (200) in the Registration Accept message;

At operation S510, on receiving the Registration Accept message, if the USIM is configured with the indication that the UE (200) shall receive the Steering Information List, then the UE (200) shall calculate the CAG-MAC-IAUSF in the same way as the AUSF (as specified in Annex A.17) on the received Steering information, the CounterCAG and the CAG header and verifies whether it matches the CAG-MAC-IAUSF value received in the Registration Accept message. Based on the CAG-MAC-IAUSF verification outcome, the behavior of the UE (200) is specified in TS 23.122 [53].

At operation S511, if the HPLMN UDM controller (100a) has requested an acknowledgement from the UE (200) and the UE (200) verified that the Steering Information List has been provided by the HPLMN in operation 9, then the UE (200) shall send the Registration Complete message to the serving VPLMN AMF controller (300b). The UE (200) shall generate the CAG-MAC-IUE as specified in Annex A.18 and includes the generated CAG-MAC-IUE in a transparent container in the Registration Complete message.

At operation S512, the VPLMN AMF controller (300b) sends a Nudm_SDM_Info request message to the HPLMN UDM controller (100a). If a transparent container with the CAG-MAC-IUE was received in the Registration Complete message, the VPLMN AMF controller (300b) shall include the transparent container in the Nudm_SDM_Info request message.

At operation S513, if the HPLMN indicated that the UE (200) is to acknowledge the successful security check of the received Steering Information List in operation S508, then the HPLMN UDM controller (100a) shall compare the received CAG-MAC-IUE with the expected CAG-XMAC-IUE that the HPLMN UDM controller (100a) stored temporarily in operation S508.

Figure 6:
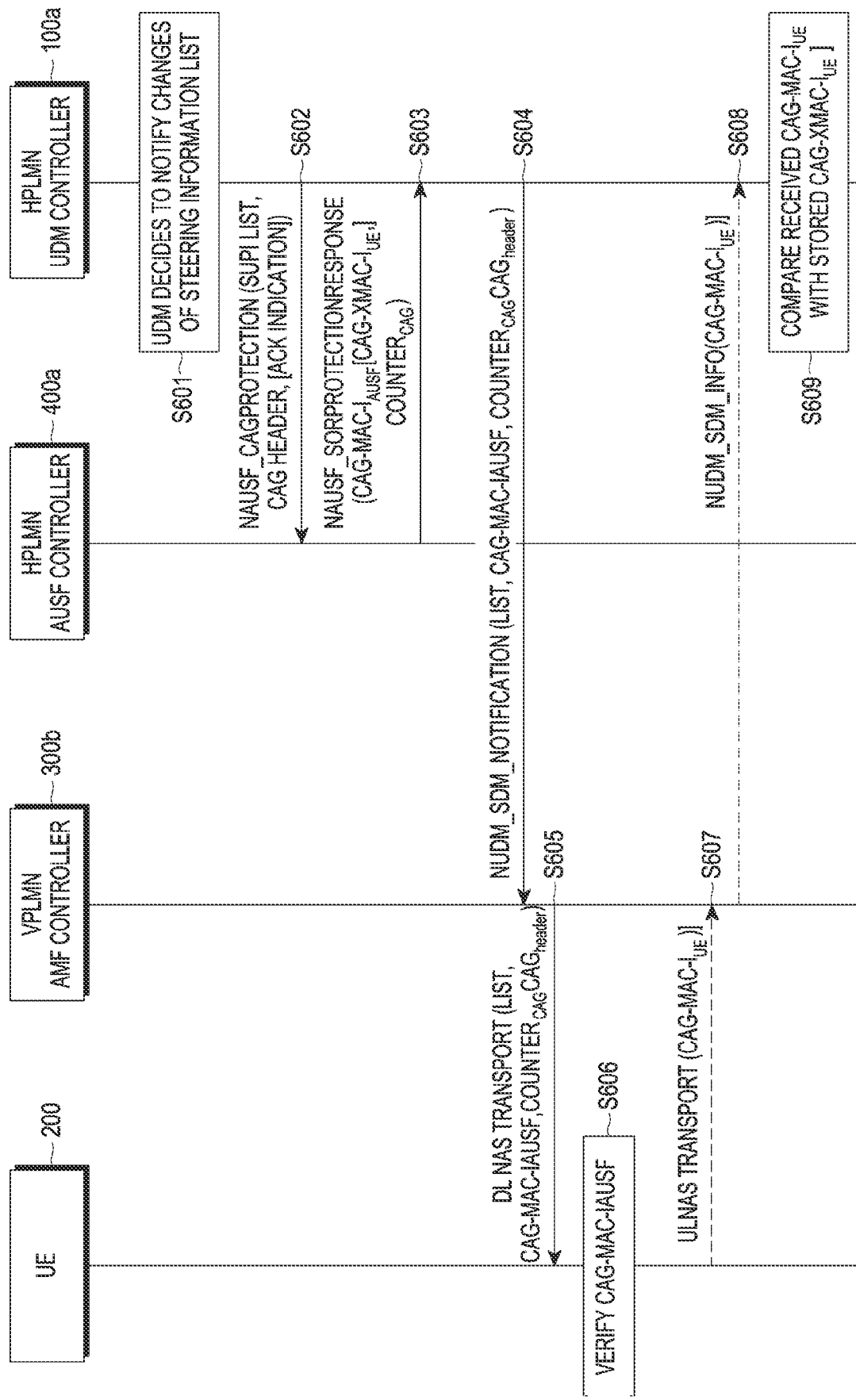
FIG. 6 is a signaling diagram illustrating a scenario of providing a CAG information list to a UE after the registration procedure, according to an embodiment of the disclosure.

FIG. 6 is a signaling diagram illustrating a scenario of providing a CAG information list to a UE after a registration procedure, according to an embodiment of the disclosure.

Referring to the FIG. 6 consider the procedure for sharing the CAG information to the UE (200) in the VPLMN after registration. The security procedure for the steering of the UE (200) in the VPLMN after registration is described below:

At operation S601, the HPLMN UDM controller (100a) decides to notify the UE (200) of the changes to the Steering Information List by the means of invoking Nudm_SDM_Notification service operation.

At operations S602-S603, the HPLMN UDM controller (100a) shall invoke Nausf_CAGProtection service operation message by including the CAG header and Steering Information List to the HPLMN AUSF controller (400a) to get CAG-MAC-IAUSF and CounterCAG as specified in sub-clause 14.1.3 of this document. If the HPLMN decided that the UE (200) is to acknowledge the successful security check of the received Steering Information List, then the HPLMN UDM controller (100a) shall set the corresponding indication in the CAG header (see TS 24.501 [35]) and include the ACK Indication in the Nausf_CAGProtection service operation message to signal that it also needs the expected CAG-XMAC-IUE.

The inclusion of Steering Information List and the acknowledge indication in the calculation of CAG-MAC-IAUSF allows the UE (200) to verify that the Steering Information List received is not tampered with or removed by the VPLMN and if the HPLMN UDM controller (100a) requested an acknowledgement. The inclusion of this information in the calculation of the expected CAG-XMAC-IUE allows the HPLMN UDM controller (100a) to verify that the UE (200) received the Steering Information.

At operation S604, the HPLMN UDM controller (100a) shall invoke Nudm_SDM_Notification service operation, which contains the list of preferred PLMN/access technology combinations, CAG-MAC-IAUSF, CounterCAG within the Access and Mobility Subscription data and the CAG header. If the HPLMN UDM controller (100a) requests an acknowledgement, it shall temporarily store the expected CAG-XMAC-IUE.

At operation S605, upon receiving the Nudm_SDM_Notification message, the VPLMN AMF controller (300b) shall send a DL NAS Transport message to the served UE (200). The VPLMN AMF controller (300b) shall include in the DL NAS Transport message the transparent container received from the HPLMN UDM controller (100a).

At operation S606, on receiving the DL NAS Transport message, the UE (200) shall calculate the CAG-MAC-IAUSF in the same way as the AUSF (as specified in Annex A.17) on the received Steering information, the Counter-CAG and the CAG header and verifies whether it matches the CAG-MAC-IAUSF value received in the DL NAS Transport message.

At operation S607, if the HPLMN UDM controller (100a) has requested an acknowledgement from the UE (200) and the UE (200) verified that the Steering Information List has been provided by the HPLMN, then the UE (200) shall send the UL NAS Transport message to the serving VPLMN AMF controller (300b). The UE (200) shall generate the CAG-MAC-IUE as specified in Annex A.18 and includes the generated CAG-MAC-IUE in a transparent container in the UL NAS Transport message.

At operation S608, the VPLMN AMF controller (300b) shall send a Nudm_SDM_Info request message to the HPLMN UDM controller (100a). If a transparent container with the CAG-MAC-IUE was received in the UL NAS Transport message, the VPLMN AMF controller (300b) shall include the transparent container in the Nudm_SDM_Info request message.

At operation S609, if the HPLMN UDM controller (100a) indicated that the UE (200) is to acknowledge the successful security check of the received Steering Information List, then the HPLMN UDM controller (100a) shall compare the received CAG-MAC-IUE with the expected CAG-XMAC-IUE that the HPLMN UDM controller (100a) stored temporarily in operation S604.

In one embodiment, the Generic UE (200) configuration update procedure also follows the above procedure to transfer CAG information list. In this case the DL NAS Transport message is replaced with Configuration update command message and UL NAS transport message is replaced with Configuration update complete message.

In one example the embodiment 1, 2 and 3 applies for case of the UE mobility within a same PLMN i.e. the UE (200) changes the Tracking Areas (TA) within the same PLMN. In this case the TAs is served by different AMFs.

Figure 7:
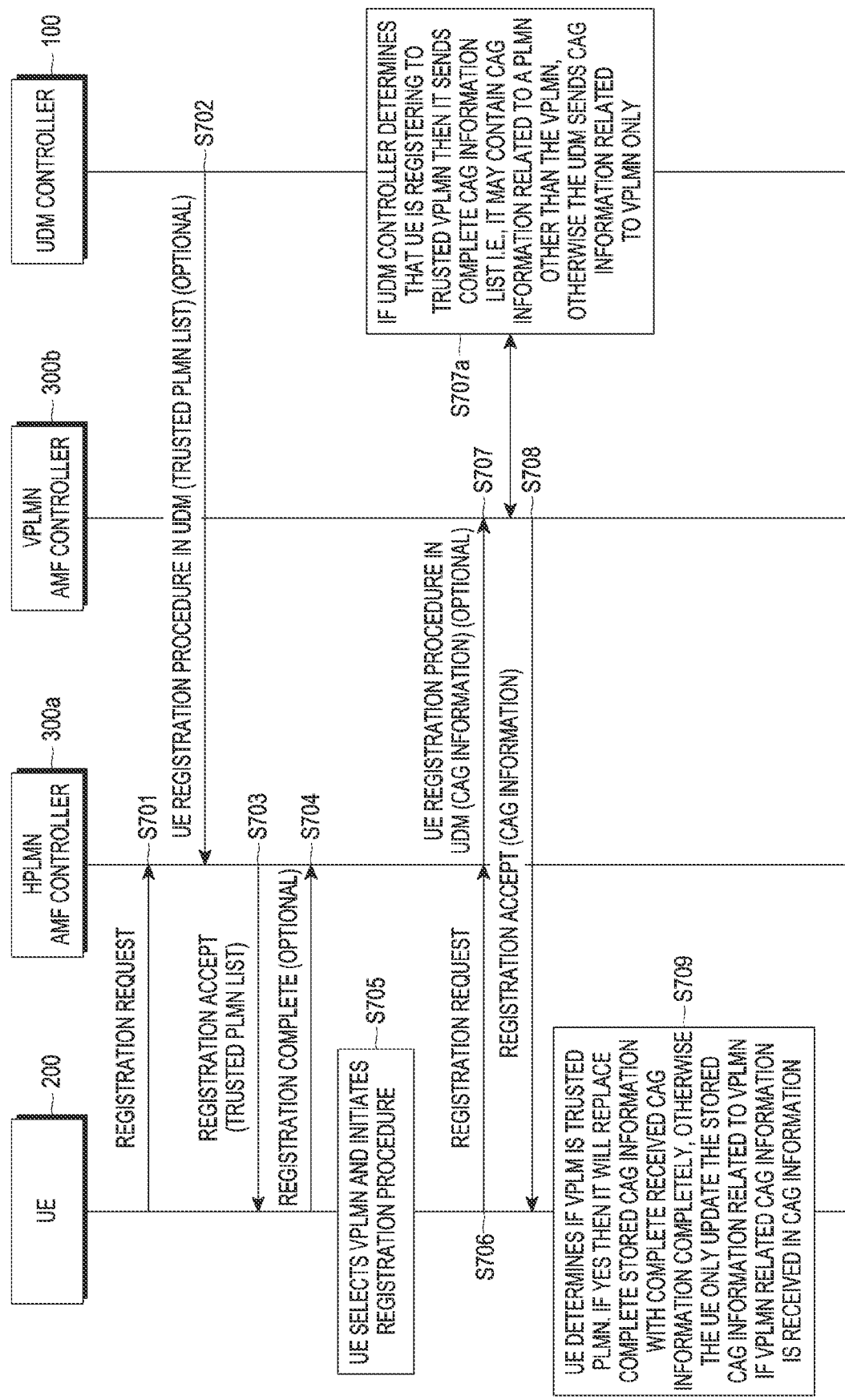
FIG. 7 is a signaling diagram illustrating updating of CAG information at a UE based on whether a visitor public land mobile network (VPLMN) is a trusted VPLMN, according to an embodiment of the disclosure.

FIG. 7 is a signaling diagram illustrating updating of CAG information at a UE based on whether a VPLMN is a trusted VPLMN, according to an embodiment of the disclosure.

Referring to the FIG. 7, consider the following operational procedure:

At operation S701, the UE (200) initiates a first NAS procedure to a first PLMN (HPLMN or VPLMN).

At operations S702-S703, the HPLMN AMF controller (300a) during the first NAS procedure sends a trusted PLMN list to the UE (200) in a first NAS message. In one example when the UDM controller (100) determines that the UE (200) is in the HPLMN UDM controller (100a) or in the VPLMN trusted by the HPLMN UDM controller (100a), then the UDM controller (100) sends the trusted PLMN list to the AMF controller (300) which in turn sends this to the UE (200). An entry in a trusted PLMN list consists of Mobile Country Code (MCC) and Mobile Network Code (MNC) of a trusted PLMN. At operation S704, UE (200) optionally may send a registration complete message to HPLMN AMF controller (300a).

At operation S705, the UE (200) stores the trusted PLMN list in the UE (200).

At operation S706, the UE (200) initiates a second NAS procedure to a second PLMN (i.e., HPLMN AMF controller (300a)).

At operation S707, the HPLMN AMF controller (300a) sends a CAG information list to the UE (200) in a second NAS message. In one example when the UDM controller (100) determines that the second VPLMN is in the trusted PLMN list or in HPLMN UDM controller (100a) at operation S707a, then the UDM controller (100) may send complete CAG subscriptions i.e. CAG information list containing CAG subscription of VPLMN(s) and HPLMN, otherwise the UDM controller (100) may send the CAG subscription of the second VPLMN only in the CAG information to the AMF controller (300) at operation 708.

At operation S709, the UE (200) determines whether the second PLMN ID is present in the trusted PLMN list or the second PLMN is the HPLMN UDM controller (100a). If the second PLMN is present in the trusted PLMN list or the HPLMN then the UE (200) shall store the complete CAG information list, else the UE (200) determines if the CAG information list contains a parameter related to the second PLMN only. Upon determination that the CAG information list contains a parameter related to the second PLMN only then the UE (200) stores the complete CAG information list, otherwise the UE (200) either ignores the CAG information or stores the parameter related to the second PLMN and ignores the parameter related to other PLMN. The UE (200) shall use stored CAG information list in a subsequent NAS or AS procedure.

The first or second NAS procedure above is a NAS procedure defined in 5GS or EPS or a new NAS procedure. In one example the first and second NAS message is an existing 5GS or EPS NAS message or a new NAS message. In one example the trusted PLMN list is pre-configured in the USIM or ME memory. The UE (200) will follow above procedure when it receives a CAG information element. The same procedure defined above can be used to transfer other UE configuration or subscription information.

Figure 8:
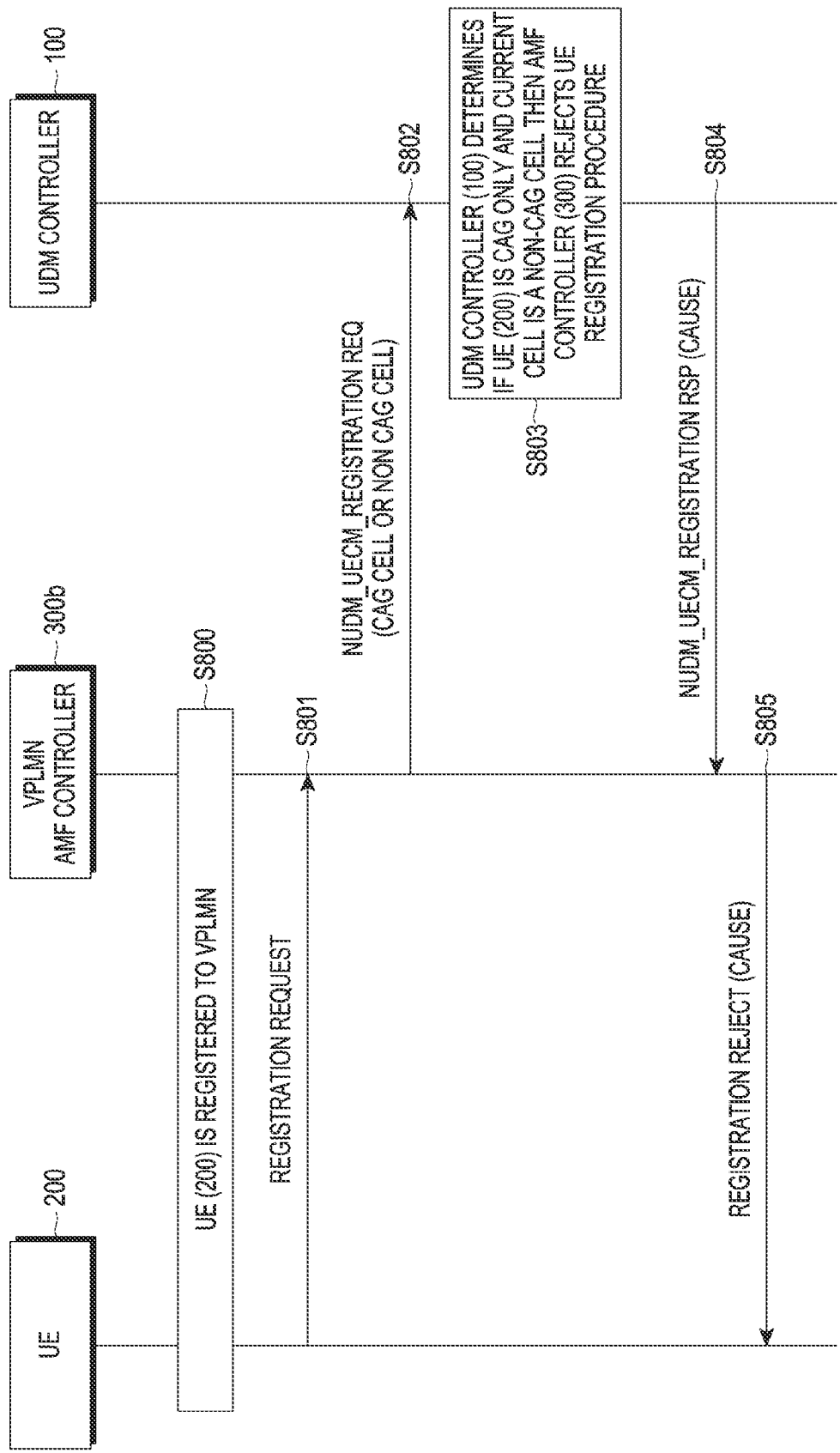
FIG. 8 is a signaling diagram illustrating a procedure to determine whether CAG information is modified at a VPLMN, according to an embodiment of the disclosure.

FIG. 8 is a signaling diagram illustrating a procedure to determine whether CAG information is modified at a VPLMN, according to an embodiment of the disclosure.

Referring to the FIG. 8 consider the following operational procedure:

At operation S800, the UE (200) is registered to a VPLMN and the VPLMN sends a CAG information list to the UE (200). The VPLMN may modify (for example, removing CAG only access option) the CAG information list before sending it to the UE (200). The UE (200) and the network (VPLMN AMF controller (300a) and HPLMN UDM controller (100a)) have completed the updating of latest CAG information to the UE (200).

At operation S801, the UE (200) initiates a NAS procedure to the VPLMN AMF controller (300b). At operation S802, the VPLMN AMF controller (300b) may send a first message to the UDM controller (100) whether the cell is a CAG cell or a non CAG cell.

At operation S803, the UDM controller (100) determines if the UE (200) is configured to access the VPLMN via a CAG cell only and the received cell type in operation S802 is a non-CAG cell, then the UDM controller (100) determines that the VPLMN is malicious and sends a second message to the VPLMN AMF controller (300b) to reject the NAS procedure (as shown in operation S804). In one example the UDM controller (100) requests the VPLMN AMF controller (300b) to send a cause PLMN not allowed cause in the second NAS message. In one example the UDM controller (100) sends a SoR not containing the VPLMN.

At operation S805, the UE (200) receives the registration reject message from the VPLMN AMF controller (300b). On receiving the cause in the NAS message the UE (200) puts the VPLMN in a forbidden PLMN list.

The following definitions may be applied to the all or part of the above embodiments:

EPC: Evolved Packet Core. It consists of MME, Serving Gateway (S-GW), Packet Gateway (P-GW), and other network node.

SGC: 5G Core Network consists of AMF, SMF, UPF and other core network nodes.

5G NAS security context: The key KAMF with the associated key set identifier, the UE security capabilities, and the uplink and downlink NAS COUNT Values. It also consists of 5G NAS ciphering and NAS. The 5G NAS security context is Native 5G NAS security context (this 5G NAS Security context is created as the result of a primary authentication and key agreement procedure between the AMF controller (300) and the UE (200) or mapped 5G NAS security context (this 5G NAS security context is created during Intersystem change from Si mode to N1 mode or during the intersystem change from Iu mode to N1 mode).

Clear text IEs: Information elements that can be sent without confidentiality protection in initial NAS messages.

Non-clear text IEs: Information elements that are not clear text IEs.

When the initial NAS message is a REGISTRATION REQUEST message, the clear text IEs are:
  Extended protocol discriminator;
  Security header type;
  Spare half octet;
  Registration request message identity;
  5GS registration type;
  ngKSI;
  5GS mobile identity;
  UE security capability;
  Additional GUTI;
  UE status; and
  EPS NAS message container.

When the initial NAS message is a SERVICE REQUEST message, the clear text IEs are:
  Extended protocol discriminator;
  Security header type;
  Spare half octet;
  ngKSI
  Service request message identity;
  Service type; and
  5G-S-TMSI.

The 5G NAS ciphering algorithms are NEA0, 128-NEA1, 128-NEA2. In all the above case the first and second PLMNs are non-equivalent PLMNs i.e. PLMNs which are not equivalent. In one example the first and the second PLMN belongs to the same country or different countries.

The definitions of several of terms used throughout the specification may be provided henceforth and apply to the embodiments described herein. For the purposes of the present document, the terms and definitions given in TR 21.905 [1] and the following apply. A term defined in the present document may take precedence over the definition of the same term, if any, in TR 21.905 [1].

5GLAN Group: A set of UEs using private communication for 5G LAN-type service.

5G Access Network: An access network comprising a NG-RAN and/or non-3GPP a connecting to a 5G Core Network.

5G Core Network: The core network specified in the present document. It connects to a 5G Access Network.

5G LAN-Type Service: A service over the 5G system offering private communication using IP and/or non-IP type communications.

5G LAN-Virtual Network: A virtual network over the 5G system capable of supporting 5G LAN-type service.

5G System: 3GPP system consisting of 5G Access Network (AN), 5G Core Network and UE.

Allowed NSSAI: NSSAI provided by the Serving PLMN during e.g. a Registration procedure, indicating the S-NSSAIs values the UE could use in the Serving PLMN for the current Registration Area.

Configured NSSAI: NSSAI provisioned in the UE applicable to one or more PLMNs.

SNPN enabled UE: A UE configured to use stand-alone Non-Public Networks.

SNPN access mode: A UE operating in SNPN access mode only selects stand-alone Non-Public Networks over Uu.

Stand-alone Non-Public Network: A non-public network not relying on network functions provided by a PLMN Subscribed S-NSSAI: S-NSSAI based on subscriber information, which a UE is subscribed to use in a PLMN CAG only UE: a UE which is indicate by the network to access the 5GS by a CAG cell.

CAG Cell: The CAG cell shall broadcast information such that only UEs supporting CAG are accessing the cell.

Non-CAG cell: cell of a public PLMN. Normal cell where the UE can access public PLMN service.

Allowed CAG list: An Allowed CAG list of a UE is a list of CAG Identifiers the UE is allowed to access.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing closed access group (CAG) related procedure in a wireless communication network, the method comprising:
  identifying, by an unified data management (UDM) entity belonging to a home public land mobile network (HPLMN), change of CAG information;
  identifying, by the UDM entity, whether a serving public land mobile network (PLMN) of a user equipment (UE) is the HPLMN; and
  sending, by the UDM entity, to an access and mobility management function (AMF) entity one of:
    a new CAG information list comprising a complete CAG subscription information associated with a plurality of PLMNs, in case that the serving PLMN is the HPLMN, or
    a new CAG information list comprising CAG subscription information associated with the serving PLMN only, in case that the serving PLMN is a visitor PLMN (VPLMN) other than the HPLMN.

2. The method of claim 1,
wherein the new CAG information list is, by the AMF entity, transferred to the UE in a non-access stratum (NAS) message.

3. The method of claim 2, wherein the NAS message comprises a trusted PLMN list.

4. The method of claim 3, wherein the trusted PLMN list comprises at least one entry comprising a mobile country code (MCC) and a mobile network code (MNC) of a trusted PLMN.

5. A method for managing closed access group (CAG) related procedure in a wireless communication network, the method comprising:
   receiving, by a user equipment (UE), a non-access stratum (NAS) message including a new CAG information list from an access and mobility management function (AMF) entity;
   identifying, by the UE, whether a serving public land mobile network (PLMN) is a home public land mobile network (HPLMN); and
   replacing an existing CAG information list stored in the UE with the received new CAG information list, in case that the serving PLMN is the HPLMN, and
   replacing only CAG information associated with the serving PLMN, other than CAG information that is not associated with the serving PLMN, in the existing CAG information list stored in the UE with CAG information associated with the serving PLMN in the received new CAG information list, in case that the serving PLMN is a visitor PLMN (VPLMN) other than the HPLMN.

6. The method of claim 5, wherein the NAS message comprises a trusted PLMN list.

7. The method of claim 6, wherein the trusted PLMN list comprises at least one entry comprising a mobile country code (MCC) and a mobile network code (MNC) of a trusted PLMN.

8. An unified data management (UDM) entity for managing closed access groups CAG related procedure in a wireless communication network, the UDM entity comprising:
   a communicator;
   a memory; and
   a controller coupled to the communicator and the memory, and configured to:
     identify a change of CAG information,
     identify whether a serving public land mobile network (PLMN) of a user equipment (UE) is a home public land mobile network (HPLMN), and
     send to an access and mobility management function (AMF) entity one of:
       a new CAG information list comprising a complete CAG subscription information associated with a plurality of PLMNs, in case that the serving PLMN is the HPLMN, or
       a new CAG information list comprising CAG subscription information associated with the serving PLMN only, in case that the serving PLMN is a visitor PLMN (VPLMN) other than the HPLMN.

9. A user equipment (UE) for managing closed access group (CAG) related procedure in a wireless communication network, the UE comprising:
   a communicator;
   a memory; and
   a controller coupled to the communicator and the memory, and configured to:
     receive, from an access and mobility management function (AMF) entity, a non-access stratum (NAS) message including a new CAG information list,
     identify whether a serving public land mobile network (PLMN) is a home public land mobile network (HPLMN),
     replace an existing CAG information list stored in the UE with the received new CAG information list, in case that the serving PLMN is the HPLMN, and
     replace only CAG information associated with the serving PLMN, other than CAG information that is not associated with the serving PLMN, in the existing CAG information list stored in the UE with CAG information associated with the serving PLMN in the received new CAG information list, in case that the serving PLMN is a visitor PLMN (VPLMN) other than the HPLMN.

10. The UDM entity of claim 8, wherein the new CAG information list is, by the AMF entity, transferred to the UE in a non-access stratum (NAS) message.

11. The UDM entity of claim 10, wherein the NAS message comprises a trusted PLMN list.

12. The UDM entity of claim 11, wherein the trusted PLMN list comprises at least one entry comprising a mobile country code (MCC) and a mobile network code (MNC) of a trusted PLMN.

13. The UE of claim 9, wherein the NAS message comprises a trusted PLMN list.

14. The UE of claim 13, wherein the trusted PLMN list comprises at least one entry comprising a mobile country code (MCC) and a mobile network code (MNC) of a trusted PLMN.

* * * * *